Patented Sept. 6, 1949

2,481,086

UNITED STATES PATENT OFFICE 2,481,086

STABILIZATION OF POLYVINYL CHLORIDE COMPOSITIONS

Desmond Cleverdon, Bournemouth, and Hanns Peter Staudinger, Ewell, England, assignors to The Distillers Company, Limited, Edinburgh, Scotland No Drawing. Application January 29, 1946, Serial No. 644,184. In Great Britain January 23, 1945

Section 1, Public Law 690, August 8, 1946
Patent expires January 23, 1965

10 Claims. (Cl. 260—45.75)

This invention is for improvements in or relating to the production of polyvinyl chloride compositions.

The thermal decomposition of polyvinyl chloride is accompanied by the evolution of hydrogen chloride and it is believed that the free hydrogen chloride present in the polymer catalyses the further decomposition thereof. Various stabilisers have been proposed for addition to polyvinyl chloride to minimise its decomposition at higher temperatures; metallic soaps have been used for this purpose, particularly lead stearate, the action of the stabilisers being that they combine with the free hydrogen chloride in the polymer to generate the metal chloride and the fatty acid.

Lead stearate is a very effective compound as a stabiliser but suffers from the disadvantage that the stearic acid as well as the lead chloride produced as a result of the action of the hydrogen chloride is not soluble in the polyvinyl chloride composition and, therefore, polyvinyl chloride stabilised with lead stearate is always opaque.

It has been proposed to take advantage of the fact that it is possible to confer solubility upon the metal halide formed from the stabiliser by attaching to the metal radicle of the stabiliser a sufficiently bulky alkyl radicle. One specific example of such a stabiliser is di-butyl tin di-laurate. This compound, on reaction with hydrogen chloride, decomposes into di-butyl tin di-chloride and lauric acid; this compound has the advantage that the metal halide is soluble in the polymer but has the disadvantage that the lauric acid is not compatible with the polymer and consequently the use of di-butyl tin di-laurate in concentrations from slightly below 1% by weight upwards give rise to a cloudy polymer composition; di-butyl tin di-laurate is, of course, a satisfactory stabiliser where it is only required to be used in very small concentrations or where the transparency of the polyvinyl chloride is of minor importance.

Whereas the dialkyl metal carboxylates have overcome the defect attached to the use of lead carboxylates, i. e. the precipitation of lead chloride, they still suffer from the defect of depositing the carboxylic acid and consequently it is an object of the present invention to provide a process for the stabilisation of polymers and copolymers of vinyl chloride and compositions containing them which will not yield opaque or cloudy products and to this end the invention contemplates the use of stabilisers which, on reaction with hydrogen chloride, split into products which are soluble in the said polymers, copolymers or compositions. It is a further object of our invention to provide stabilised compositions comprising polymers and copolymers of vinyl chloride of improved electrical properties.

According to the present invention, therefore, a method of stabilising a polymer or copolymer of vinyl chloride, or compositions thereof, against thermal decomposition comprises adding to said polymer, copolymer or composition a di-alkyl di-alkoxy compound of a metal of Group IV b of the Periodic Table according to Mendeleef in which the alkyl radicles are such that the corresponding di-alkyl di-chloride of the said metal is soluble in the said polymer or copolymer or in the composition; preferably the alkyl radicles each contain not less than four carbon atoms and the alkyl radicle of the alkoxy group is of aliphatic or substituted aliphatic nature containing from one to eight carbon atoms. Of the said metals we prefer to use tin and lead. The di-butyl tin di-alkoxides are particularly satisfactory stabilisers and result in the production of transparent products. The stabiliser of our invention may be added prior, during or after polymerisation, but preferably after polymerisation.

The action of the organo-metallic compounds utilised in accordance with the present invention is to undergo double decomposition on reaction with hydrogen chloride to produce on the one hand the dialkyl di-chloride of the said metal and on the other hand the aliphatic alcohol corresponding to the alkoxy radicles. For example, di-butyl tin di-butoxide produces di-butyl tin di-chloride and normal butanol both of which compounds are soluble in polyvinyl chloride and in polyvinyl chloride compositions and in copolymers of vinyl chloride and compositions thereof.

Dibutyl tin dibutoxide may be made by first forming the butyl magnesium bromide compound by the usual Grignard technique and reacting it with an ethereal solution of tin tetra-bromide whereby there is produced the di-butyl tin di-bromide. This may then be reacted in situ with sodium butoxide to give di-butyl tin di-butoxide; the other stabilisers of this invention may be made in an analogous manner.

The following examples illustrate the advantages arising from operating in accordance with the present invention and illustrate various methods of carrying the invention into effect:

*Example 1.*—3 tubes were filled each with a mixture consisting of 2 g. of polyvinyl chloride and 10 ccs. of dibutyl phthalate. To the first tube there was added 0.1 g. of dibutyl tin dimethoxide, to the second tube was added 0.1 g. of lead stearate and the third tube was used as a comparison blank.

All three tubes were immersed in an oil bath and maintained at a temperature of 180°–185° C. for 15 minutes; the tubes were then removed from the oil bath, cooled and were then examined for colour and appearance. The first tube exhibited a pale yellow colour indicating a very slight degree of decomposition but it was perfectly transparent. The second tube was whitish in colour but was completely opaque, whilst the third tube, which was the blank comparison mixture, was a very deep red colour but was transparent. The depth of colour exhibited by the three samples of polyvinyl chloride is a measure of the amount of thermal decomposition which has taken place, the deeper colour being indicative of a higher degree of decomposition; it should be seen, therefore, that whereas the lead stearate was whitish, indicating practically no decomposition, the tube containing the dibutyl tin di-methoxide was a very pale yellow indicating that very little thermal decomposition had occurred, whilst the blank comparison sample had undergone very considerable decomposition. The polyvinyl chloride subjected to test in the foregoing example was of a comparatively poor quality, i. e. possessed a certain colour and was not water white and the colour obtainable by the use of di-butyl tin methoxide would have been less had a purer sample of polyvinyl chloride been used for the tests.

Example 2.—Two mixes were prepared as follows:

| | Grams |
|---|---|
| (A) Polyvinyl chloride | 100 |
| Methyl glycol phthalate | 50 |
| Tin stearate | 3.5 |
| (B) Polyvinyl chloride | 100 |
| Methyl glycol phthalate | 50 |
| Dibutyl tin dibutoxide | 3.5 |

Each of these mixes was compounded on steam heated rollers at 135° C. for 8 minutes. By this time the mix was fully homogenised and could be rolled out into a thin sheet. Sheet (A) was opaque while sheet (B) was fairly transparent.

Example 3.—100 g. of a copolymer of 95 parts by weight of vinyl chloride and 5 parts by weight of ethyl maleate were mixed with 20 g. tricresyl phosphate, 10 g. dibutyl phthalate and 5 g. dibutyl tin di-butoxide. This mix was heated on rollers at 135° to 140° C. for 5 minutes and the compounded mass was taken off as a thick sheet of 3 mm. thickness. This sheet was pressed for 3 minutes between polished plates at 150° C. and 0.3 ton per square inch pressure. The pressed sheet (2.5 mm. thick) was transparent to such an extent that when put over a newspaper, the print was clearly visible and distinguishable.

When preparing an identical composition but using 2.5 g. lead oxide in place of the 5 g. dibutyl tin dibutoxide above referred to the sheet of 2.5 mm. thickness is opaque to such an extent that newspaper print is not visible through the sheet.

Example 4.—Two mixes were prepared, each containing 100 g. of a copolymer made by the polymerisation of 92 parts by weight of vinyl chloride and 8 parts by weight of vinyl acetate and 35 g. of dioctyl phthalate. To one mixture there was added 3.5 g. of dibutyl tin diethoxide (mixture A) whilst to the other there was added 35 g. of lead stearate (mixture B). Each of these mixes (A) and (B) was then compounded for 10 minutes on heated rollers at 135° C. and the compounded mixes were then compressed between polished plates to give sheets of ⅛" thickness. The sheet from mixture A was transparent, whereas the sheet from mixture B was only translucent.

Example 5.—100 g. of a copolymer prepared by the polymerisation of 95 parts by weight of vinyl chloride and 5 parts by weight of vinylidene chloride were mixed on steam-heated rollers at 140° for 5 minutes with 45 g. of tricresyl phosphate and 10 g. of dibutyl lead dioctoxide. After the mix had become homogeneous it was sheeted out into sheets of 1 mm. thickness. These sheets were fully transparent, whereas those prepared under identical conditions but containing lead stearate as the stabiliser instead of the dibutyl lead dioctoxide was opalescent.

Example 6.—10 g. of vinyl chloride, containing 0.03 g. of crotonyl peroxide, and 0.5 g. dibutyl tin di-octoxide were dispersed in 20 ccs. of 0.2% by weight aqueous solution of gelatine in a sealed tube. This tube was placed in a thermostat at 45° C. and the contents agitated by end-over-end rotation. After 30 hours, polymerisation was substantially complete and the polymer was in the form of a granular powder. A similar powder was made without the addition of the dibutyl tin dioctoxide stabiliser. Both polymers were washed and dried on a suction filter and then compounded with an equal weight of di-octyl phthalate. The polymer prepared in the presence of the stabiliser gave a pale straw-coloured translucent sheet, whereas that prepared in the absence of the stabiliser gave a deep-brown opaque sheet.

Example 7.—100 g. of polyvinyl chloride was mixed with 40 g. of di-octyl phthalate and divided into two portions, A and B. To portion A there was added 5 g. dibutyl tin di-chloride and to portion B there was added 5 g. dibutyl tin dibutoxide. Both portions were milled at 150° C. for 20 minutes, after which time, sheets of equal thickness were pressed from the two mixtures. The sheet formed from portion B was found to have a superior light transmission to that formed from portion A.

The invention also includes the stabilised polyvinyl chloride polymers obtained by the process of the present invention and compositions containing the stabilised polyvinyl chloride from which, if desired, one of the products of decomposition of the stabiliser, e. g. the alcohol, may be removed during a subsequent manipulative treatment thereof.

What we claim is:

1. A heat stable vinyl resin composition comprising a polymeric vinyl resin containing vinyl chloride units in its structure and a stabiliser comprising a dibutyl dialkoxy compound of a metal of Group IV b of the Periodic Table according to Mendeleef, the alkoxy groups in said metal compound each containing not more than eight carbon atoms said compositions remaining substantially translucent to transparent on prolonged heating.

2. A plasticised composition of matter comprising a polymeric vinyl resin containing vinyl chloride units in its structure, a plasticiser, and a stabiliser comprising a dibutyl dialkoxy compound of a metal of Group IV b of the Periodic Table according to Mendeleef, the alkoxy groups in said metal compound each containing not more than eight carbon atoms said compositions remaining substantially translucent to transparent on prolonged heating.

3. A composition of matter comprising a polymeric vinyl resin containing vinyl chloride units in its structure and a stabiliser comprising a dibutyl tin dialkoxide whereof the alkoxy groups each contain not more than eight carbon atoms said compositions remaining substantially translucent to transparent on prolonged heating.

4. A composition of matter comprising a polymeric vinyl resin containing vinyl chloride units in its structure and a stabiliser comprising a dibutyl lead dialkoxide whereof the alkoxy groups each contain not more than eight carbon atoms said compositions remaining substantially translucent to transparent on prolonged heating.

5. A composition of matter comprising a polymeric vinyl resin containing vinyl chloride units in its structure and a stabiliser comprising a dibutyl lead dioctoxide said compositions remaining substantially translucent to transparent on prolonged heating.

6. A composition of matter comprising a polymeric vinyl resin containing vinyl chloride units in its structure and a stabiliser comprising a dibutyl tin dimethoxide said compositions remaining substantially translucent to transparent on prolonged heating.

7. A composition of matter comprising a polymeric vinyl resin containing vinyl chloride units in its structure and a stabiliser comprising dibutyl tin dibutoxide said compositions remaining substantially translucent to transparent on prolonged heating.

8. A process for the production of a stabilised polymeric material comprising the step of polymerising a mixture containing vinyl chloride and a stabiliser comprising a dibutyl dialkoxy compound of a metal of Group IV $b$ of the Periodic Table according to Mendeleef, the alkoxy groups in said metal compound each containing not more than eight carbon atoms.

9. A stabilised synthetic resin composition comprising a copolymer of vinyl chloride and vinylidene chloride and a stabiliser comprising a dibutyl dialkoxy compound of a metal of Group IV $b$ of the Periodic Table according to Mendeleef, the alkoxy groups in said metal compound each containing not more than eight carbon atoms said compositions remaining substantially translucent to transparent on prolonged heating.

10. A stabilised synthetic resin composition comprising a copolymer of vinyl chloride and a vinyl ester and a stabiliser comprising a dibutyl dialkoxy compound of a metal of Group IV $b$ of the Periodic Table according to Mendeleef, the alkoxy groups in said metal compound each containing not more than eight carbon atoms said compositions remaining substantially translucent to transparent on prolonged heating.

DESMOND CLEVERDON.
HANNS PETER STAUDINGER.

REFERENCES CITED

The following references are of record in the file of this patent:

UNITED STATES PATENTS

| Number | Name | Date |
| --- | --- | --- |
| 2,267,779 | Yngve | Dec. 30, 1941 |
| 2,307,092 | Yngve | Jan. 5, 1943 |